UNITED STATES PATENT OFFICE.

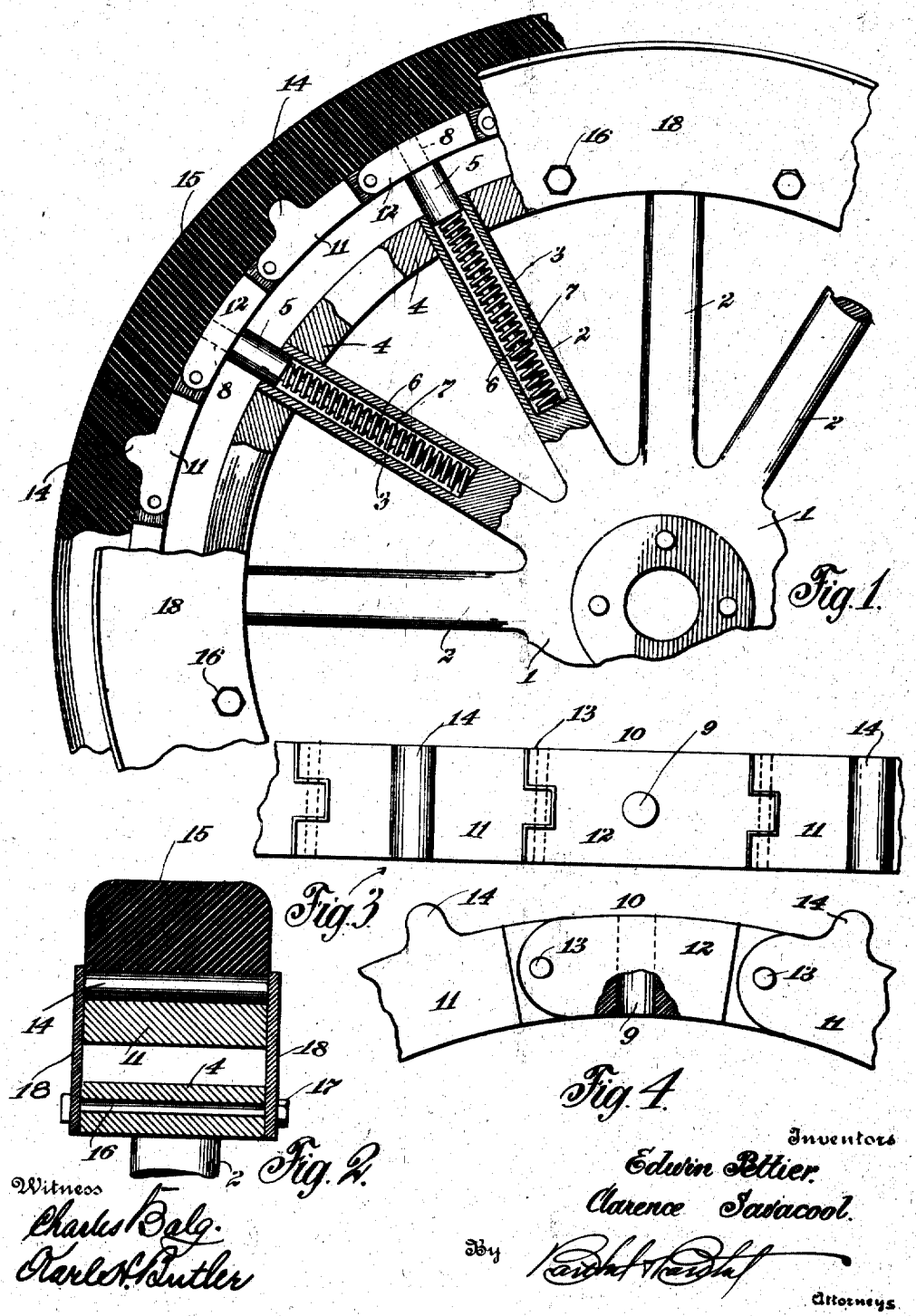

EDWIN PELTIER AND CLARENCE SAVACOOL, OF DETROIT, MICHIGAN.

RESILIENT WHEEL.

1,279,754.  Specification of Letters Patent.  Patented Sept. 24, 1918.

Application filed September 6, 1917. Serial No. 190,033.

*To all whom it may concern:*

Be it known that we, EDWIN PELTIER and CLARENCE SAVACOOL, citizens of the United States of America, residing at Detroit, in the county of Wayne, State of Michigan, have invented certain new and useful Improvements in Resilient Wheels, of which the following is a specification, reference being had therein to the accompanying drawings.

This invention relates to resilient wheels, and has special reference to the wheels of automobiles or other vehicles.

The primary object of our invention is to provide a wheel which obviates the necessity of using inner pneumatic tubes for maintaining the tire in operative condition, and as a substitute for a tube, we have devised novel yieldable means for engaging the inner wall of an outer casing or shoe and maintaining the outer casing or shoe taut, such means being protected against the elements, stones and other road obstacles that might otherwise injure the casing distending means.

A further object of our invention is to provide a flexible and yieldable casing distending member that is simple in construction, durable, easy to install, and highly efficient for the purposes for which it is intended.

The above and other objects are attained by a mechanical construction that will be hereinafter more fully considered, and then claimed.

Reference will now be had to the drawing, wherein—

Figure 1 is a side elevation of a portion of a wheel in accordance with our invention, partly broken away and partly in section, Fig. 2 is a cross sectional view of the same, Fig. 3 is a plan of a portion of a detached flexible member, and Fig. 4 is a side elevation of the same, partly in section.

In the drawing, the reference numeral 1 denotes the hub portion of a wheel having spokes 2, and these spokes for the greater part of their length are hollow or provided with bores 3.

Fixed on the outer ends of the spokes by any suitable fastening means is a rim or felly 4, said spokes having the outer ends thereof flush with and open at the periphery of the rim or felly.

Slidable in the outer ends of the spokes are plungers 5 having the inner ends thereof provided with stems 6 within the bores 3 of the spokes, said stems being encircled by coiled springs 7, the expansive force of which is sufficient to hold the plungers extended relatively to the spokes. The outer ends of the plungers 5 are formed with studs 8 that fit in openings 9 of a flexible member 10, said member being in the form of an endless chain having curved links 11 and 12, the latter having the openings 9 for the studs 8 of the plungers 5. The links, as best shown in Figs. 3 and 4, are connected in the usual manner by pins 13, and the links 11 have transverse ribs 14 extending into the inner wall of a solid tire 15 surrounding the chain or flexible member 10. The tire is preferably made of rubber and the ribs 14 prevent the tire from creeping or shifting about the flexible member.

Connected to the sides of the rim or felly 4, by bolts 16 and nuts 17 or other fastening means, are detachable side plates 18 that engage the sides of the flexible member and the sides of the tire 15, thus preventing lateral movement of the tire relatively to the flexible member and the rim.

Since the flexible member is yieldably held, portions of the tire may be crowded when a particular portion is shifted toward the rim, and with the wheel rapidly moving, all of the springs in the spokes will coöperate in cushioning the outer casing or shoe relatively to the rim.

By removing one or both of the side plates 18, easy access may be had to the flexible member and the spokes, for removing the plungers should the springs need renewing.

One embodiment of our invention has been illustrated but it is to be understood that the structural elements are susceptible to such changes as fall within the appended claim.

What we claim is;—

In a wheel, the combination with hollow spokes, a rim on the outer ends of said spokes and having the periphery thereof flush with the ends of the spokes, plungers slidable in the outer ends of the hollow spokes, stems carried by said plungers and extending into the hollow spokes, springs in the hollow spokes holding said plungers normally extended, a chain the same width as said rim and having alternate links mounted on the outer ends of said plungers and the other links provided with transverse ribs, a tire on said chain having the side walls thereof flush with the sides of said chain and having the inner wall thereof held by the ribs of said chain, and plates detachably connected to the sides of said rim and engaging the side walls of said chain and said tire for holding said tire against lateral movement on said chain.

In testimony whereof we affix our signatures in presence of two witnesses.

EDWIN PELTIER.
CLARENCE SAVACOOL.

Witnesses:
ANNA M. DORR,
LEWIS E. FLANDERS.